US010565152B2

(12) United States Patent
Kawamoto et al.

(10) Patent No.: US 10,565,152 B2
(45) Date of Patent: Feb. 18, 2020

(54) TRANSFER DEVICE, CONTROL DEVICE, TRANSFER METHOD, AND MULTIFUNCTION PERIPHERAL

(71) Applicant: CANON KABUSHIKI KAISHA, Tokyo (JP)

(72) Inventors: Tomoyuki Kawamoto, Kawasaki (JP); Tadayuki Ito, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/961,958

(22) Filed: Apr. 25, 2018

(65) Prior Publication Data

US 2018/0314668 A1 Nov. 1, 2018

(30) Foreign Application Priority Data

Apr. 27, 2017 (JP) .................... 2017-088783

(51) Int. Cl.
| G06F 13/42 | (2006.01) |
| H04N 1/00 | (2006.01) |
| G06F 3/12 | (2006.01) |
| G06K 15/02 | (2006.01) |

(52) U.S. Cl.
CPC ........ G06F 13/4243 (2013.01); G06F 3/1293 (2013.01); G06F 13/42 (2013.01); G06K 15/1817 (2013.01); H04N 1/00095 (2013.01)

(58) Field of Classification Search
CPC .... G06F 13/4243; G06F 13/42; G06F 3/1293; G06K 15/02; H04N 1/00095
See application file for complete search history.

(56) References Cited

U.S. PATENT DOCUMENTS

| 8,982,398 | B2* | 3/2015 | Miyahara | G06F 3/1218 |
| | | | | 358/1.15 |
| 2012/0110219 | A1* | 5/2012 | Yamaki | G06F 13/42 |
| | | | | 710/32 |
| 2013/0265180 | A1* | 10/2013 | Matsumoto | H03M 1/0697 |
| | | | | 341/110 |

FOREIGN PATENT DOCUMENTS

| JP | 2002366507 A | 12/2002 |
| JP | 2010015275 A | 1/2010 |
| JP | 2014107585 A | 6/2014 |
| JP | 2015099477 A | 5/2015 |

* cited by examiner

Primary Examiner — Henry Tsai
Assistant Examiner — John B Roche
(74) Attorney, Agent, or Firm — Rossi, Kimms & McDowell LLP

(57) ABSTRACT

A transfer device is one of a plurality of transfer devices each configured to transfer data between a storage device and a processing device. The storage device and the transfer devices are connected via a bus. The transfer device comprise: an issuing unit configured to issue a request for transferring data via the bus; an analysis unit configured to analyze data to be transferred; and a switching unit configured to switch a state of a series of requests issued by the issuing unit between a first state and a second state in which a request from another transfer device interrupts more easily than in the first state, according to a data attribute obtained as a result of analysis.

20 Claims, 12 Drawing Sheets

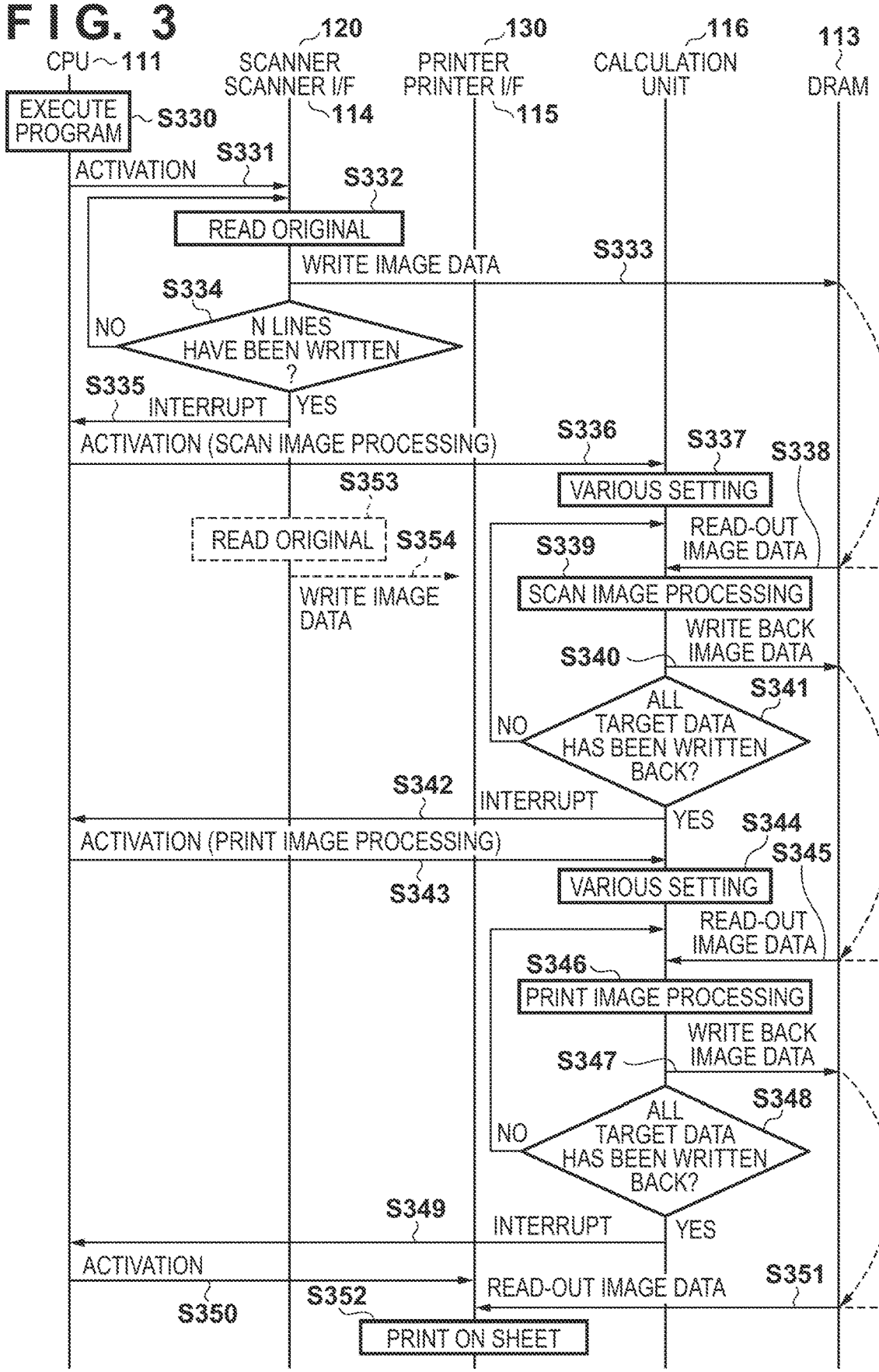

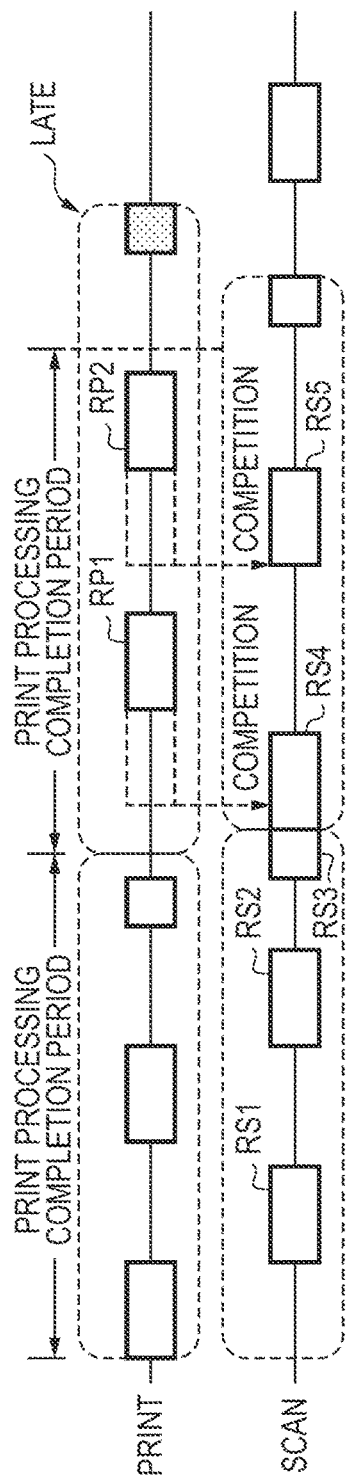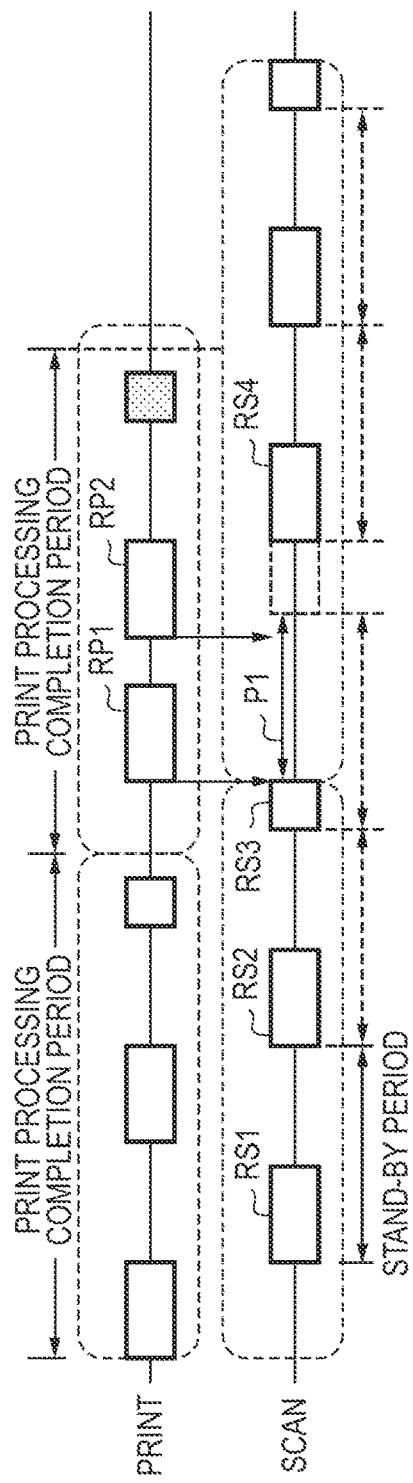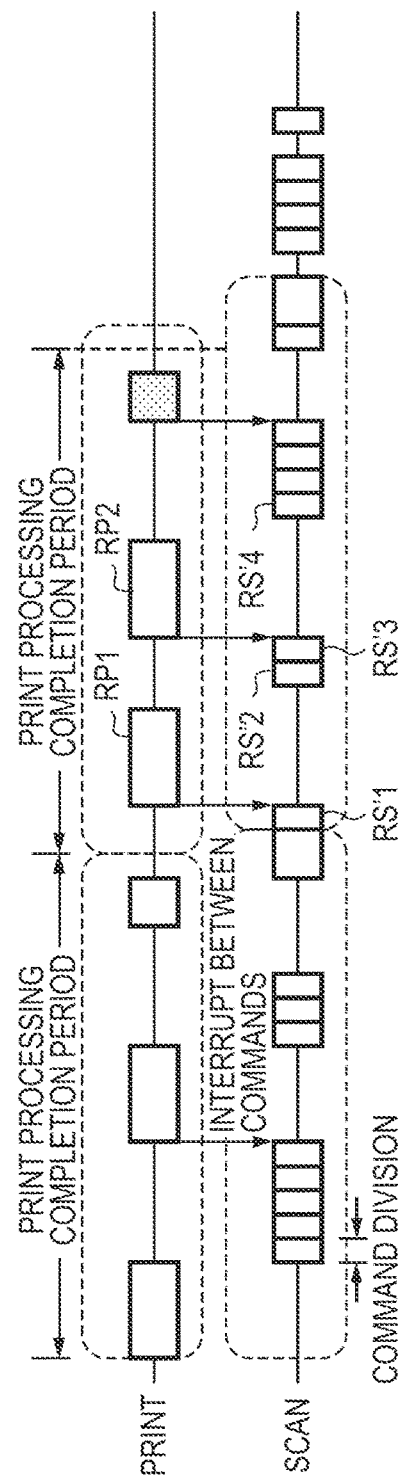

F I G. 5
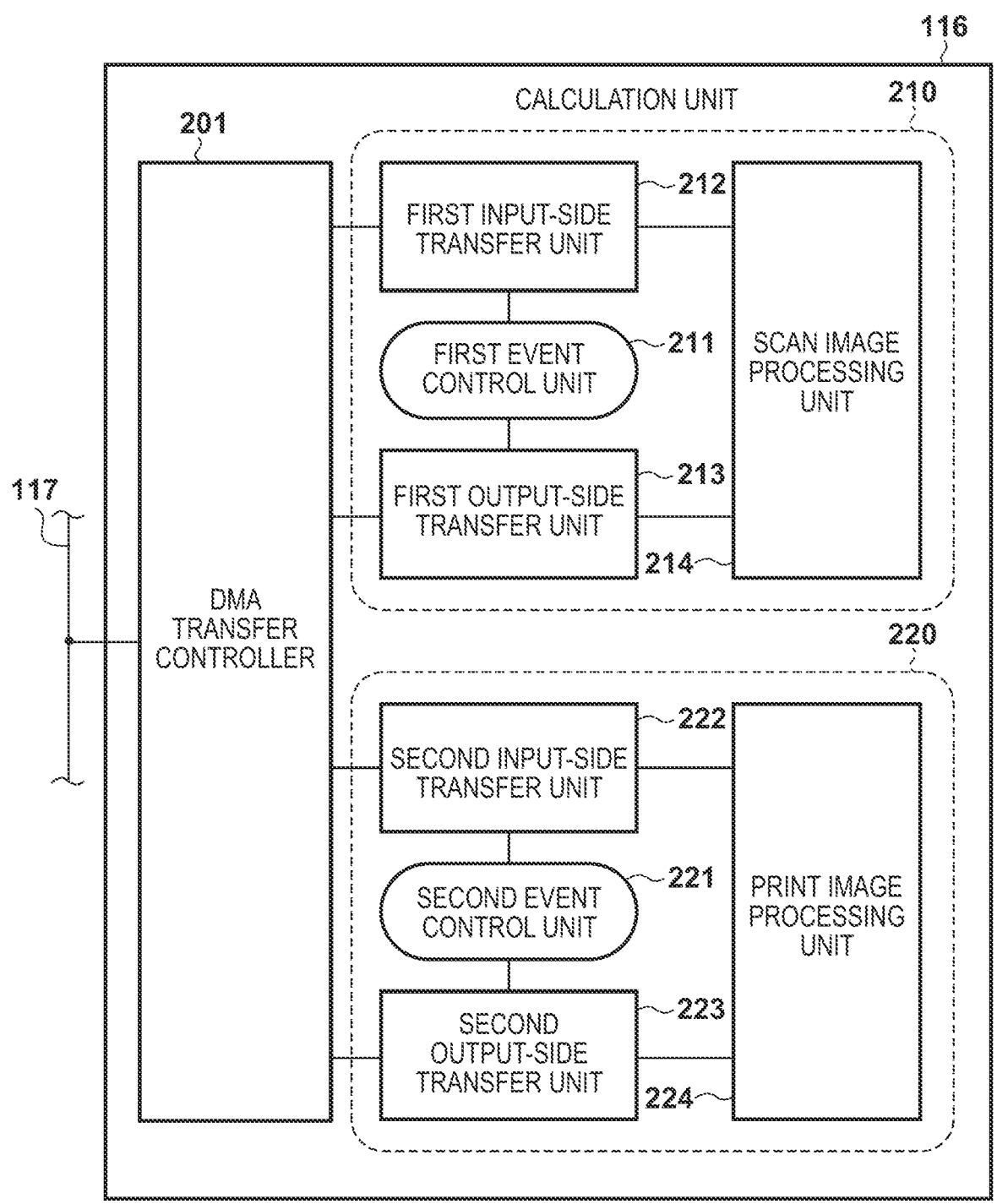

FIG. 13A

| NUMBER OF CONSECUTIVE TRANSFERS (R) | DRAM ADDRESS | DRAM OFFSET | BUFFER ADDRESS | BUFFER OFFSET |
|---|---|---|---|---|

1ST TIME: R>T

FIG. 13B

| NUMBER OF CONSECUTIVE TRANSFERS (T) | DRAM ADDRESS | DRAM OFFSET | BUFFER ADDRESS | BUFFER OFFSET |
|---|---|---|---|---|

2ND TIME: R−T>T

FIG. 13C

| NUMBER OF CONSECUTIVE TRANSFERS (T) | DRAM ADDRESS +OFFSET×1T | DRAM OFFSET | BUFFER ADDRESS +OFFSET×1T | BUFFER OFFSET |
|---|---|---|---|---|

3RD TIME: R−2T>T

FIG. 13D

| NUMBER OF CONSECUTIVE TRANSFERS (T) | DRAM ADDRESS +OFFSET×2T | DRAM OFFSET | BUFFER ADDRESS +OFFSET×2T | BUFFER OFFSET |
|---|---|---|---|---|

4TH TIME: R−3T≤T

FIG. 13E

| NUMBER OF CONSECUTIVE TRANSFERS (R−3T) | DRAM ADDRESS +OFFSET×3T | DRAM OFFSET | BUFFER ADDRESS +OFFSET×3T | BUFFER OFFSET |
|---|---|---|---|---|

TRANSFER DEVICE, CONTROL DEVICE, TRANSFER METHOD, AND MULTIFUNCTION PERIPHERAL

BACKGROUND OF THE INVENTION

Field of the Invention

The present invention relates to a transfer device, a control device, a transfer method, and a multifunction peripheral.

Description of the Related Art

In an apparatus having a scanning function and a printing function such as a multifunction peripheral, when copy processing is performed, while an original is read by a scanner, printing is performed at the same time in order to complete the processing quickly. At this time, processing is repeated in which image data obtained by scanning is successively stored in a DRAM via a bus, and in a stage when scanning of several lines is complete, the image data stored in the DRAM is read out and printing is executed. However, the transfer of the image data obtained by the scanner and the image data used for printing is performed via a common bus, and therefore the bandwidth load acting on the bus becomes large in copy processing in which the scanner and the printer operate at the same time. Particularly, if bus access from the scanner side temporarily becomes intensive during copy processing, the data transfer for printing is delayed on the printer side. If the bus bandwidth necessary for the scan operation cannot be ensured, there is a possibility that copy processing will not be performed correctly due to a failure of obtaining data. If data supply is delayed, a print head is no longer able to be operated continuously without stopping, and thus there is a possibility that printing will not be performed correctly.

In view of this circumstance, in a system including a plurality of devices that perform data transfer via a bus, various technologies for supplying data at a speed necessary for the devices have been developed. For example, Japanese Patent Laid-Open No. 2014-107585 discloses a technology for performing control such that, in the case where scan processing and print processing operate in parallel, data transfer to a print engine is prevented from being delayed by setting a long period in which a print processing unit is permitted to access the bus. Japanese Patent Laid-Open No. 2010-15275 discloses a technology in which a bandwidth load acting on a bus is monitored periodically, and if the bandwidth load on the bus exceeds a fixed amount, the amount of data transfer is suppressed. Japanese Patent Laid-Open No. 2015-99477 discloses a technology in which a concentration of data transfer on a bus is suppressed by temporally dispersing switches between buffer read and write operations in a DMAC in which data transfer is performed in units of blocks. Japanese Patent Laid-Open No. 2002-366507 discloses a DMAC in which DMA transfer using multiple channels is controlled. This DMAC avoids a state in which a specific channel occupies the bus and keeps other devices waiting, by dividing transfer requests from the channels into a predetermined data transfer amount and executing the requests.

However, in the method described in Japanese Patent Laid-Open No. 2014-107585, unless data to be transferred has always been prepared in the period in which using the bus is allowed, time for which the bus bandwidth cannot be used sufficiently will arise. In the method described in Japanese Patent Laid-Open No. 2010-15275, it is difficult to predict the timing at which data transfer speed is suppressed, and therefore it is difficult to apply the method to a device for which real-time operations such as scan processing and print processing are needed. In the method described in Japanese Patent Laid-Open No. 2015-99477, a wait cycle is designated for allowing switching of the buffering operations such that the data transfer can be performed at a speed necessary for real-time operation. However, this system is configured such that the wait cycle is switched by an event signal from a CPU, and therefore time is required to switch the data transfer speed, and stand-by time is required before moving to the next processing. In the method described in Japanese Patent Laid-Open No. 2002-366507, the DMA transfer data amount is controlled according to the transfer speed of the access destination during DMA transfer. However, DMA transfer is performed in a divided manner also in the transfer of print processing setting values and in the transfer of scan processing setting values that need high-speed data transfer, and therefore the transfer speed is suppressed at an undesired timing.

SUMMARY OF THE INVENTION

An aspect of the present invention provides a configuration in which, when multiple processes are performed in parallel, a bandwidth necessary for performing each process can be assigned while also effectively using a bus and a processing circuit by simple control.

An aspect of the present invention is provided with the following configuration.

A transfer device that is one of a plurality of transfer devices each configured to transfer data between a storage device and a processing device, the storage device and the transfer devices being connected via a bus, and the transfer device comprising: an issuing unit configured to issue a request for transferring data via the bus; an analysis unit configured to analyze data to be transferred; and a switching unit configured to switch a state of a series of requests issued by the issuing unit between a first state and a second state in which a request from another transfer device interrupts more easily than in the first state, according to a data attribute obtained as a result of analysis.

According to the exemplary aspect of the present invention, when multiple processes are performed in parallel, a bandwidth necessary for performing each process can be assigned while also effectively using a bus and a processing circuit by simple control.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention, and together with the description, serve to explain the principles of the invention.

FIG. 3 is a flowchart showing an example of an operation flow when the multifunction peripheral in FIG. 1 performs copy processing.

FIGS. 4A to 4C are schematic diagrams showing data transfer on a bus.

FIG. 5 is a block diagram showing functions and a configuration of a calculation unit in FIG. 1.

FIGS. 13A to 13E are diagrams for illustrating division of a DMA transfer request.

DESCRIPTION OF THE EMBODIMENTS

Figure 1:
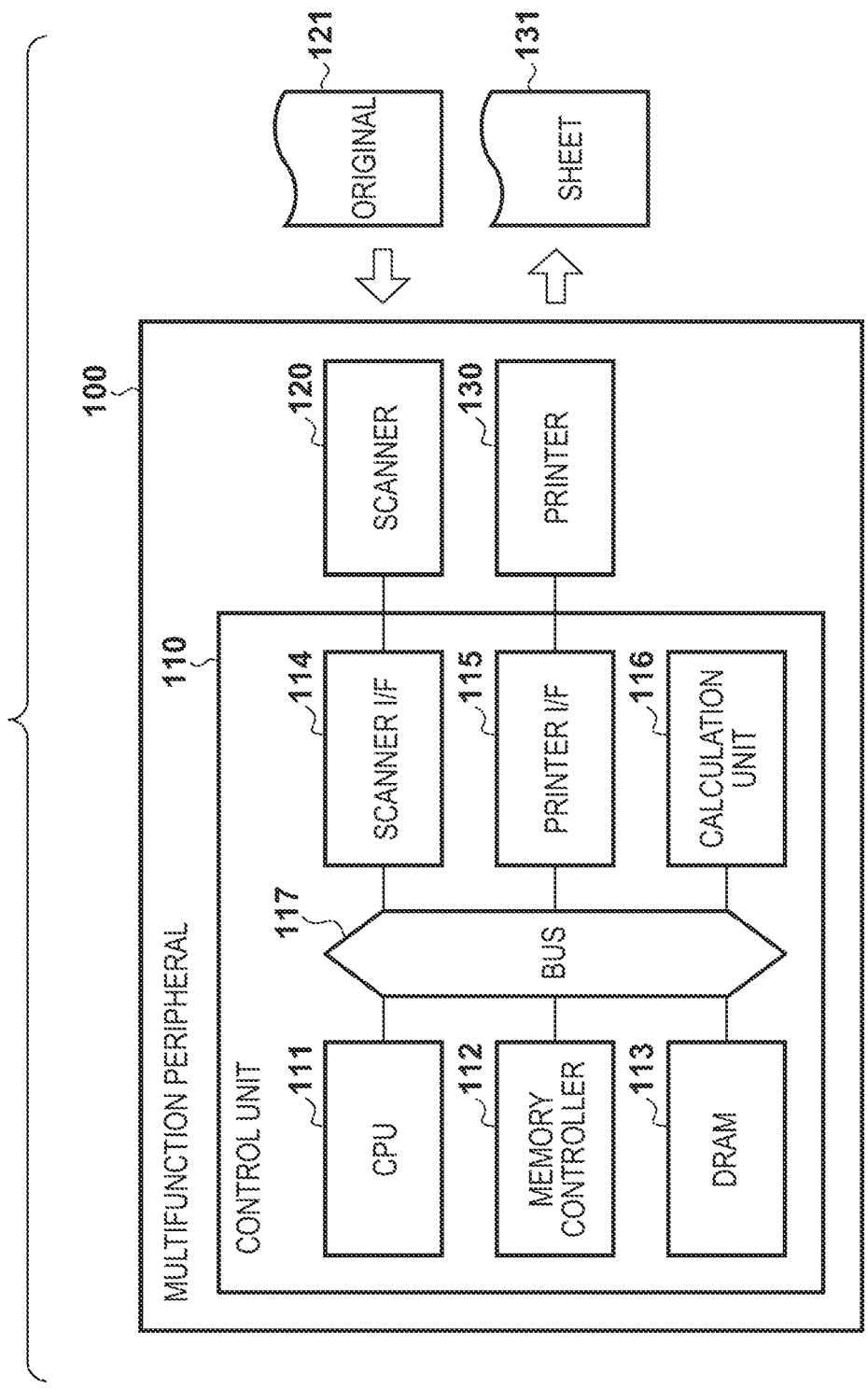
FIG. 1 is a block diagram showing an example of a configuration of a multifunction peripheral according to a first embodiment.

In the following, the same or similar constituent elements, members, and processes in the drawings are given the same reference signs, and redundant description is omitted as appropriate. In addition, portions of members that are not important for description are omitted.

In the embodiments, in a data transfer device, a high-speed transfer mode in which data transfer is performed at high speed and a suppressed-speed transfer mode in which data transfer speed is suppressed are autonomously switched according to an attribute and content of the data to be transferred. By doing this, the data transfer speed is controlled at appropriate timings without CPU's intervention, and therefore it is possible to ensure the bandwidth of the bus necessary for processing units to perform data transfer.

First Embodiment

FIG. 1 is a block diagram showing an example of a configuration of a multifunction peripheral 100 according to a first embodiment. The multifunction peripheral 100 is provided with a control unit 110, a scanner 120, and a printer 130. The scanner 120 is an optical device by which an original 121 is read and converted to image data. Specifically, the scanner 120 emits light onto the original 121, receives a reflection light by an imaging element, generates analog data, performs A/D conversion, and thus obtains image data. The printer 130 is a printing device that discharges ink onto a sheet 131 according to print image data, and thus forms an image on the sheet 131. Note that, the printer 130 is not limited to such an inkjet-type printing device, and may be a printing device using an electrophotographic method or other printing method.

The control unit 110 is a control device that gives operation instructions to the scanner 120 and the printer 130 and performs image transfer, and image processing. The control unit 110 includes a CPU 111, a memory controller 112, a DRAM 113, a scanner I/F 114, a printer I/F 115, and a calculation unit 116. These constituent elements are connected to a bus 117 and perform data exchange via the bus 117.

The scanner I/F 114 is provided between the scanner 120 and the bus 117, and functions as an interface therebetween.

The printer I/F 115 is provided between the printer 130 and the bus 117, and functions as an interface therebetween. The CPU 111 is a processor that controls the multifunction peripheral 100. The bus 117 is a signal transmission path used when data is transferred between constituent elements of the control unit 110. Data transfer cannot be performed from multiple constituent elements at the same time on the bus 117, and therefore the constituent element from which data is transferred on the bus 117 is controlled by a memory controller 112.

The memory controller 112 is a bus arbiter that arbitrates the right to send a signal to the bus 117 (bus use right) for the constituent elements of the control unit 110. The memory controller 112 manages requests for data transfer performed on the bus 117. The memory controller 112 receives requests sent from constituent elements, and executes the requests in order. If requests from multiple constituent elements are received at the same time, the memory controller 112 executes the requests in order of highest priority.

The DRAM 113 is a main storage device of the multifunction peripheral 100. The DRAM 113 stores (holds) image data used for scanning and printing, setting values of the calculation unit 116, and a display list. The display list is data indicating a command sequence that describes what processing is to be performed by the calculation unit 116.

The calculation unit 116 is a device that is controlled by the display list, and that performs image processing on scan images and print images. The image processing includes scan image processing and print image processing. In scan image processing, gamma (γ) correction for correcting colors shifted due to the characteristics of optical elements to natural colors, edge enhancement for clarifying the outline of characters, and the like are performed on the image data read by the scanner 120. In print image processing, color space conversion for conversion to a printable CMYK color space, gamma (γ) conversion for conversion to a tone appropriate to be expressed with ink, and the like are performed on the image data that is to be printed.

Figure 2:
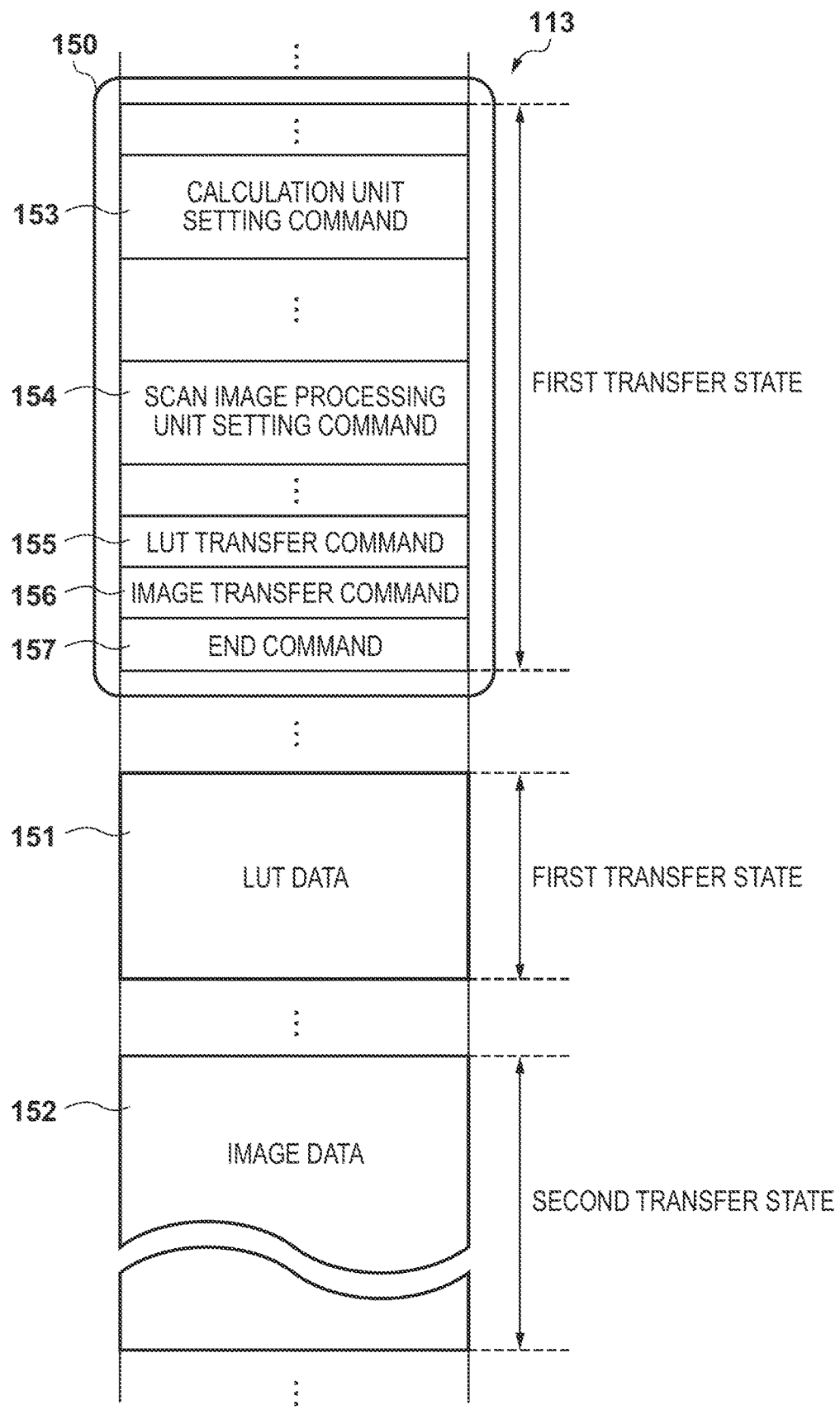
FIG. 2 is a schematic diagram showing an example of a display list used when performing scan processing.

FIG. 2 is a diagram showing an example of the display list 150 for performing scan processing. The control of the calculation unit 116 by the display list 150 will be described below. FIG. 2 shows a state in which the display list 150, LUT (Look-Up Table) data 151, and image data 152 are held in the DRAM 113. Since the display list 150 is processed in order from the top, a calculation unit setting command 153 is executed first. According to the calculation unit setting command 153, setting is performed with respect to a first event control unit 211, a first input-side transfer unit 212, and a first output-side transfer unit 213, which will be described later. Specifically, according to the calculation unit setting command 153, setting is performed with respect to a burst length in DMA (Direct Memory Access) transfer, a type of interrupt to be transmitted to the CPU 111, an address and data amount of data to be transferred when an image transfer command 156 and an LUT transfer command 155 are decoded, and the like.

Next, a scan image processing unit setting command 154 is executed, and setting for the size and format of the image to be processed is performed with respect to a later-described scan image processing unit 214. Thereafter, the LUT transfer command 155 is executed, and LUT data stored in the DRAM 113 is read out according to the setting performed by the above-described calculation unit setting command 153. The LUT data is for performing setting with respect to the scan image processing unit 214 for processing having relatively many setting values, such as color space conversion. Next, the image transfer command 156 is executed, and image data obtained by the scanner 120 and stored in the DRAM 113 is read out according to the setting performed by the above-described calculation unit setting command 153. The calculation unit 116 in which various settings were set executes scan image processing on the read-out image data. Finally, an end command 157 is executed, and the calculation unit 116 transmits an interrupt to the CPU 111.

The display list used for performing print processing has a configuration similar to the display list 150 shown in FIG. 2.

FIG. 3 is a flowchart showing an example of an operation flow when the multifunction peripheral 100 in FIG. 1 performs copy processing. In step S330, when the start of copy processing is instructed by a user operation, the CPU 111 starts execution of a program for copy processing. In step S331, the CPU 111 activates the scanner 120 via the scanner I/F 114, and then in step S332, the scanner 120 starts scan processing, that is the reading of an original. The scanner I/F 114 issues a transfer request to the memory controller 112 for writing the image data obtained by the scanner 120 to the DRAM 113. In step S333, the scanner I/F 114 writes the obtained image data to the DRAM 113 according to the transfer request. When scan data corresponding to N lines (N is a predetermined natural number) is written to the DRAM 113 (S334: Y), then in step S335, the scanner I/F 114 transmits an interrupt to the CPU 111.

Upon receiving this interrupt, the CPU 111 activates the calculation unit 116 in step S336 to execute processing on the scan image. In step S337, the calculation unit 116 performs various setting according to the display list for scanning. In step S338, the calculation unit 116 reads out the scanned image data from the DRAM 113, and then in step S339, performs scan image processing. In step S340, the calculation unit 116 writes back the processed image data to the DRAM 113. After writing back all the processed data to the DRAM 113 (S341: Y), in step S342, the calculation unit 116 transmits an interrupt to the CPU 111.

Upon the completion of the scan image processing, the CPU 111 starts control for print processing. In step S343, the CPU 111 activates the calculation unit 116 again in order to generate image data for printing. In step S344, the calculation unit 116 performs various setting according to the display list for printing. In step S345, the calculation unit 116 reads out the image data subjected to scan image processing from the DRAM 113, and then in step S346, performs print image processing. In step S347, the calculation unit 116 writes back the processed image data to the DRAM 113. After writing back all the processed data to the DRAM 113 (S348: Y), in step S349, the calculation unit 116 transmits an interrupt to the CPU 111.

Upon receiving this interrupt, in step S350, the CPU 111 activates the printer 130 via the printer I/F 115 in order to perform printing. In step S351, the printer I/F 115 reads out the image data that was subjected to print image processing from the DRAM 113, and transmits the image data to the printer 130. In step S352, the printer 130 performs printing on the sheet 131 using the received image data. By performing the above processing repeatedly on the entirety of the original 121, the copy processing is complete.

In the above-described copy processing, in order to be able to perform scan processing and print processing at the same time, the constituent elements are controlled so as to operate in parallel. For example, even while the scanner I/F 114 transmits an interrupt and the CPU 111 activates the calculation unit 116, the scanner 120 continues to read the rest of the original 121 in parallel (S353, S354). Thereafter, even while processing advances in the calculation unit 116, when scanning of data corresponding to N lines is complete by the scanner 120, the scanner I/F 114 transmits an interrupt again. In this way, in copy processing, scan processing and print processing are performed at the same time, and thus it is desirable that such processing operates without causing a delay in the speed of printing on the sheet 131. In addition, in order to supply data to the printer 130 without delay, the operating speed of scan processing is designed to be higher than that of print processing.

However, while the scanner I/F 114, the printer I/F 115, and the calculation unit 116 operate in parallel, a case where the scanner temporarily generates a lot of data transfers may occur, such as a case where many lines continue to be read on the scanner side. In this case, as shown in FIG. 4A, the bandwidth of the bus 117 is temporarily occupied due to scanner processing. As a result, the bandwidth of the bus 117 that is necessary for supplying data for performing printing to the printer 130 becomes insufficient, and thus there is a possibility that printing will not be performed correctly or print processing will be delayed. In this embodiment, the calculation unit 116 includes a configuration to solve this problem. In the following, the calculation unit 116 will be described.

FIG. 5 is a diagram showing functions and the configuration of the calculation unit 116 in FIG. 1. The calculation unit 116 includes a DMA transfer controller 201, a scan data processing unit 210, and a print data processing unit 220. The scan data processing unit 210 obtains image data from the DRAM 113, performs scan image processing, and transmits the image data to the DRAM 113. The scan data processing unit 210 includes a first event control unit 211, a first input-side transfer unit 212, a first output-side transfer unit 213, and a scan image processing unit 214. The print data processing unit 220 obtains image data from the DRAM 113, performs print image processing, and transmits the image data to the DRAM 113. The print data processing unit 220 includes a second event control unit 221, a second input-side transfer unit 222, a second output-side transfer unit 223, and a print image processing unit 224.

The DMA transfer controller 201 is a control unit that receives DMA transfer requests from multiple ports and transmits the DMA transfer requests to the memory controller 112. Specifically, the DMA transfer controller 201 is connected to the first input-side transfer unit 212, the first output-side transfer unit 213, the second input-side transfer unit 222, and the second output-side transfer unit 223, and configured to be capable of receiving DMA transfer requests from each of them. The DMA transfer controller 201 is connected to the DRAM 113 via the bus 117. The DMA transfer controller 201 transmits data received from the DRAM 113 to the issuing source of the DMA transfer request corresponding to the data. In addition, in the case where competition occurs in which DMA transfer requests are received from multiple ports at the same time, the DMA transfer controller 201 queues the DMA transfer requests as tasks, and processes the DMA transfer requests in First-in First-out order. The competition occurs in the case where, for example, a DMA transfer request from the first input-side transfer unit 212 and a DMA transfer request from the second input-side transfer unit 222 are received by the DMA transfer controller 201 at the same time.

The first input-side transfer unit 212 (second input-side transfer unit 222) issues a DMA transfer request for obtaining image data and a display list from the DRAM 113, and transmits the received data to the scan image processing unit 214 (print image processing unit 224). Upon executing an end command, the first input-side transfer unit 212 (second input-side transfer unit 222) performs notification to the first event control unit 211 (second event control unit 221) and stops the operation.

The first output-side transfer unit 213 (second output-side transfer unit 223) receives the processed image data and the display list from the scan image processing unit 214 (print image processing unit 224), and issues a DMA transfer request for writing the received data to the DRAM 113. Upon executing an end command, the first output-side transfer unit 213 (second output-side transfer unit 223) performs notification to the first event control unit 211 (second event control unit 221) and stops the operation.

The first event control unit 211 (second event control unit 221) issues an instruction to start the operation to the first input-side transfer unit 212 (second input-side transfer unit 222) and the first output-side transfer unit 213 (second output-side transfer unit 223) when the calculation unit 116 is activated. Upon receiving processing end notifications from both the first input-side transfer unit 212 (second input-side transfer unit 222) and the first output-side transfer unit 213 (second output-side transfer unit 223), the first event control unit 211 (second event control unit 221) issues an interrupt to the CPU 111. Thereafter, the first event control unit 211 (second event control unit 221) stops the operation.

The scan image processing unit 214 performs scan image processing on the image data transmitted from the first input-side transfer unit 212, and transmits the processed image data to the first output-side transfer unit 213. The print image processing unit 224 processes the data so as to be suited to printing by the printer 130. Specifically, the print image processing unit 224 performs print image processing on the image data transmitted from the second input-side transfer unit 222, and transmits the processed image data to the second output-side transfer unit 223.

The operation performed by the calculation unit 116 in scan image processing will be described below. The CPU 111 notifies the first event control unit 211 of the activation of the calculation unit 116. The first event control unit 211 instructs the first input-side transfer unit 212 to start data transfer, and instructs the first output-side transfer unit 213 to wait for the reception of data. The first input-side transfer unit 212 issues a DMA transfer request for reading out a display list and image data from the DRAM 113 according to the data transfer start instruction, and transmits the DMA transfer request to the DMA transfer controller 201. The DMA transfer controller 201 reads out data from the DRAM 113 according to the DMA transfer request received from the first input-side transfer unit 212, and transmits the read-out data to the first input-side transfer unit 212.

The first input-side transfer unit 212 transfers the data received from the DMA transfer controller 201 to the scan image processing unit 214 and performs analysis on the received data, and then upon receiving the end command, notifies the first event control unit 211 thereof. The scan image processing unit 214 performs scan image processing on the data transferred from the first input-side transfer unit 212, and transmits the processed data to the first output-side transfer unit 213.

The first output-side transfer unit 213 issues a DMA transfer request for writing the data received from the scan image processing unit 214 to the DRAM 113 and performs analysis on the received data, and then upon receiving an end command, notifies the first event control unit 211 thereof. The DMA transfer controller 201 performs writing of the data to the DRAM 113 according to the DMA transfer request received from the first output-side transfer unit 213. Finally, upon receiving the end notifications from both the first input-side transfer unit 212 and the first output-side transfer unit 213, the first event control unit 211 ends scan image processing and transmits an interrupt to the CPU 111. Note that, generally, transfer processing on the input-side ends prior to transfer processing on the output-side, and thus the first event control unit 211 may end scan image processing upon receiving the end notification from the first output-side transfer unit 213. The operation performed by the calculation unit 116 in print image processing is similar to the above-described operation performed in scan image processing.

Figure 6:
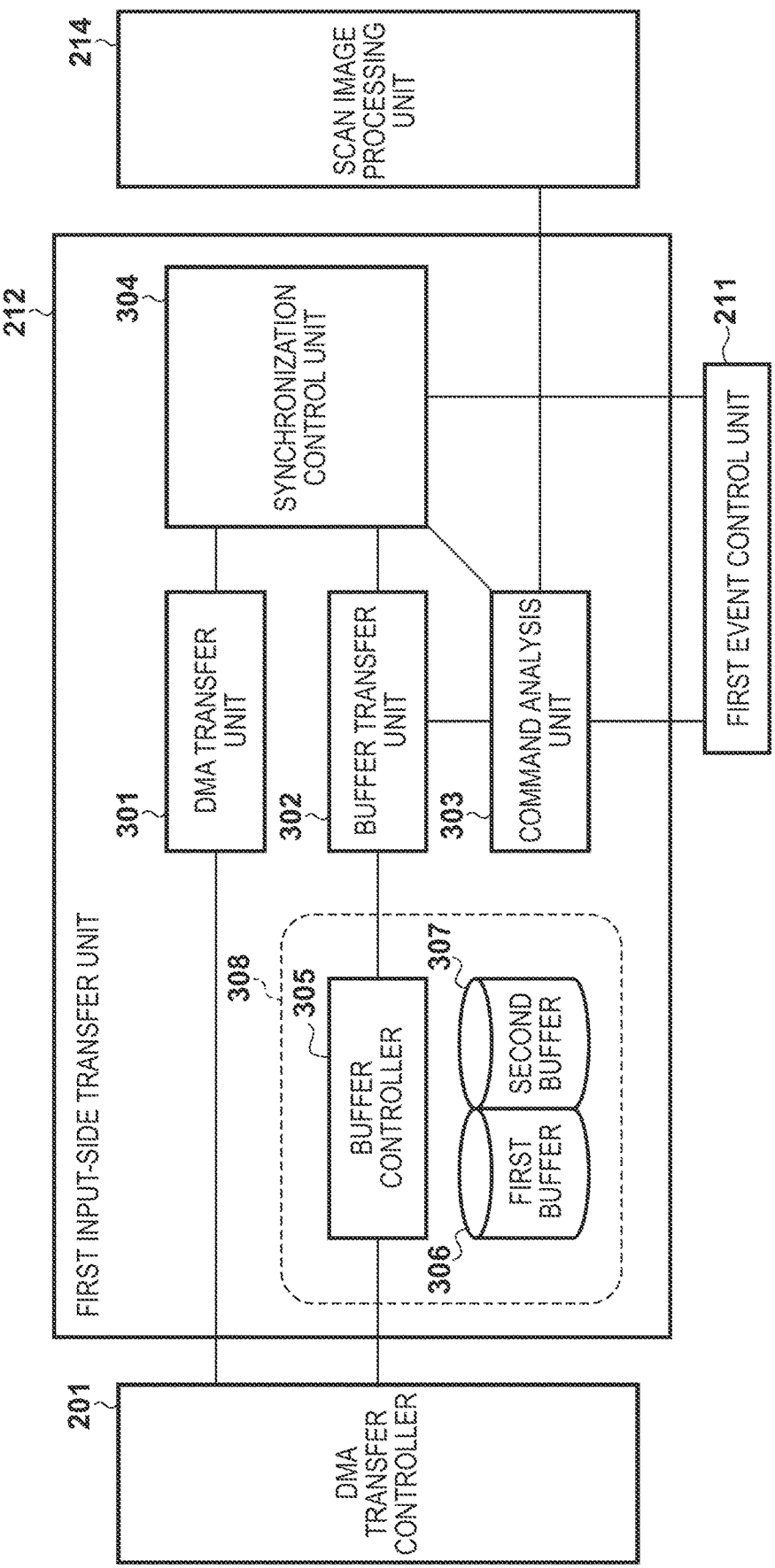
FIG. 6 is a block diagram showing functions and a configuration of a first input-side transfer unit in FIG. 5.

FIG. 6 is a diagram showing the functions and configuration of the first input-side transfer unit 212 in FIG. 5. The first input-side transfer unit 212 includes a DMA transfer unit 301, a buffer transfer unit 302, a command analysis unit 303, a synchronization control unit 304, and a buffer unit 308. The buffer unit 308 includes a buffer controller 305, a first buffer 306, and a second buffer 307. The first output-side transfer unit 213, the second input-side transfer unit 222, and the second output-side transfer unit 223 each have a configuration similar to the configuration of the first input-side transfer unit 212 shown in FIG. 6.

The DMA transfer unit 301 issues a DMA transfer request to the DMA transfer controller 201 according to an instruction from the synchronization control unit 304. In the case of the first input-side transfer unit 212 and the second input-side transfer unit 222, the DMA transfer request is a request for transferring data from the DRAM 113 to the buffer unit 308. In the case of the first output-side transfer unit 213 and the second output-side transfer unit 223, the DMA transfer request is a request for transferring data from the buffer unit 308 to the DRAM 113. Upon completing a data transfer between the DRAM 113 and the buffer unit 308, the DMA transfer controller 201 notifies the DMA transfer unit 301 thereof. Upon receiving this notification, the DMA transfer unit 301 notifies the synchronization control unit 304 of the completion of the data transfer.

The buffer transfer unit 302 accesses the buffer unit 308 according to an instruction from the synchronization control unit 304. In the case of the first input-side transfer unit 212 and the second input-side transfer unit 222, the buffer transfer unit 302 reads out data from the buffer unit 308 and transmits the data to the command analysis unit 303. In the case of the first output-side transfer unit 213 and the second output-side transfer unit 223, the buffer transfer unit 302 writes data received from the command analysis unit 303 to the buffer unit 308. Upon completing a data transfer between the buffer unit 308 and the command analysis unit 303, the buffer transfer unit 302 notifies the synchronization control unit 304 of the completion of the data transfer.

The buffer controller 305 is a controller that controls writing to and reading from the first buffer 306 and the second buffer 307 which hold data. When an access for writing to the buffer unit 308 occurs, the buffer controller 305 accesses an empty buffer. When an access for reading from the buffer unit 308 occurs, the buffer controller 305 accesses a buffer in which data is accumulated. These operations are performed in parallel when an access for writing and an access for reading occur at the same time. In this way, access performed by the DMA transfer unit 301 and access performed by the buffer transfer unit 302 may be performed in parallel.

The command analysis unit 303 analyzes the content of data exchanged between the buffer transfer unit 302 and the scan image processing unit 214 (in the case of the second input-side transfer unit 222 or the second output-side transfer unit 223, between the buffer transfer unit 302 and the print image processing unit 224). The command analysis unit 303 transmits a result of the analysis to the synchronization control unit 304 and performs the setting of the synchronization control unit 304, and notifies the first event control unit 211 of the result of the analysis as well. The setting of the synchronization control unit 304 is, for example, the setting of a timer used when buffer change control is performed, which is obtained by decoding the calculation unit setting command 153. If the end command 157 is decoded, the command analysis unit 303 notifies the first event control unit 211 of the end of the processing. The command analysis unit 303 notifies the synchronization control unit 304 of the start of image data transfer if the image transfer command 156 is decoded, and notifies of the start of configuration data transfer if an image data the final pixel command is decoded.

The synchronization control unit 304 controls the transfer sequence according to the data attribute obtained as a result of the analysis from the command analysis unit 303, and gives instructions for executing data transfer to the DMA transfer unit 301 and the buffer transfer unit 302 at timings according to the transfer sequence. In the transfer sequence, transitions occur between a high-speed transfer mode and a suppressed-speed transfer mode according to the data attribute. As will be described later with reference to FIGS. 4B and 4C, the states of a series of DMA transfer requests issued by the DMA transfer unit 301 include a high-speed transfer state that is realized in the high-speed transfer mode, and a suppressed-speed transfer state that is realized in the suppressed-speed transfer mode. The synchronization control unit 304 switches the state of the series of transfer requests between the high-speed transfer state and the suppressed-speed transfer state, by switching the mode according to the data attribute.

Figure 7:
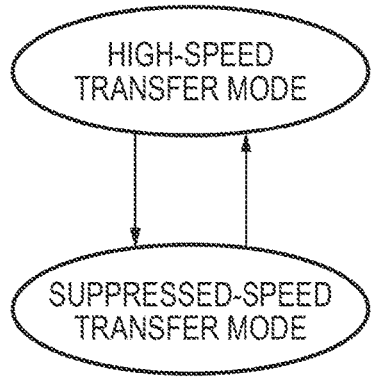
FIG. 7 is a diagram for illustrating control of a transfer sequence.

FIG. 7 is a diagram for illustrating the control of the transfer sequence. When data transfer is started, the transfer sequence transitions to the high-speed transfer mode. In the high-speed transfer mode, when the start of the image data transfer is notified to the synchronization control unit 304 by the command analysis unit 303, the transfer sequence transitions to the suppressed-speed transfer mode. This transition is synchronized with the control of the data transfer instructions given to the DMA transfer unit 301 and the buffer transfer unit 302. On the other hand, in the suppressed-speed transfer mode, when the start of configuration data transfer is notified, the transfer sequence transitions to the high-speed transfer mode. This transition is synchronized with the control of the data transfer instructions given to the DMA transfer unit 301 and the buffer transfer unit 302. In the example of the display list 150 shown in FIG. 2, the transfer sequence is in the high-speed transfer mode during transfer of the setting command and the LUT data 151, and the transfer sequence is in the suppressed-speed transfer mode during transfer of the image data 152.

In this embodiment, the suppressed-speed transfer mode is used when transferring the image data 152 that has a large data transfer amount, but the present invention is not limited to this. For example, in the case where the data amount of the LUT is large, the suppressed-speed transfer mode may also be used when transfer of the LUT data 151 is performed. That is, in the case where decoding obtains a command for which the data transfer amount is large and there is a high probability that concentrated accesses to the bus 117 will occur and thus the bus 117 will be occupied, it is desirable to transition to the suppressed-speed transfer mode.

Returning to FIG. 6, instructions for data transfer in the modes of the transfer sequence will be described below. The instructions for data transfer in the case of the first input-side transfer unit 212 and the second input-side transfer unit 222 include the following two instructions.

(1) An instruction for starting a transfer, which is transmitted to the DMA transfer unit 301 when the buffer unit 308 is free. In this case, accumulation of data in the buffer unit 308 is performed.

(2) An instruction for starting a transfer, which is transmitted to the buffer transfer unit 302 when data is accumulated in the buffer unit 308. In this case, reading-out of the data in the buffer unit 308 is performed.

The instructions for data transfer in the case of the first output-side transfer unit 213 and the second output-side transfer unit 223 include the following two instructions.

(3) An instruction for starting a transfer, which is transmitted to the buffer transfer unit 302 when the buffer unit 308 is free.

(4) An instruction for starting a transfer, which is transmitted to the DMA transfer unit 301 when data is accumulated in the buffer unit 308.

Figure 8:
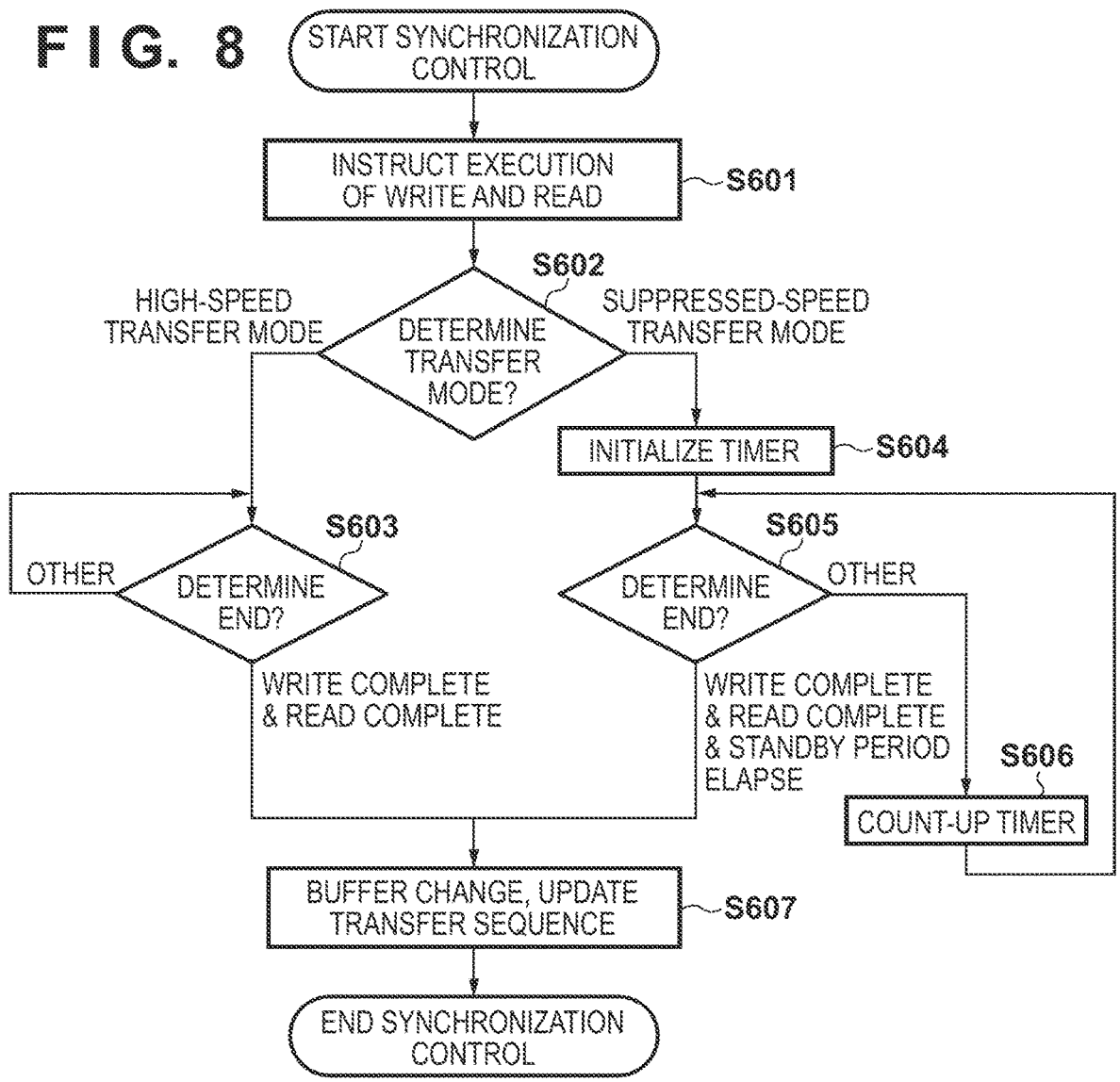
FIG. 8 is a flowchart for illustrating synchronization control.

The instructions for data transfer are given in synchronized manner between the DMA transfer unit 301 and the buffer transfer unit 302. FIG. 8 is a flowchart for illustrating synchronization control. When data transfer is started, in step S601, the synchronization control unit 304 gives a transfer start instruction to the DMA transfer unit 301 and the buffer transfer unit 302. In accordance with to this instruction, the DMA transfer request is issued from the DMA transfer unit 301. In step S602, the synchronization control unit 304 determines or checks the mode of the transfer sequence, and if the mode is the high-speed transfer mode, the sequence moves to step S603, and if the mode is the suppressed-speed transfer mode, the sequence moves to step S604.

In step S603 corresponding to the high-speed transfer mode, the synchronization control unit 304 stands by until the completion of transfer is notified from both the DMA transfer unit 301 and the buffer transfer unit 302, determines that data transfer is complete at the point when both notifications are received, and then moves to step S607. On the other hand, in the suppressed-speed transfer mode, upon receiving the notifications of the completion of transfer from both the DMA transfer unit 301 and the buffer transfer unit 302, the synchronization control unit 304 determines whether or not a predetermined stand-by period has elapsed from the previous buffer change. If the period has not elapsed, the synchronization control unit 304 stands by without performing the buffer change, in other words, without moving to the next data transfer. Therefore, in step S604, the synchronization control unit 304 initializes a timer. In step S605, the synchronization control unit 304 determines whether or not the notification of the completion of transfer has been issued, and whether or not the stand-by period has elapsed. Even if the notifications of completion of transfer have been issued from both the DMA transfer unit 301 and the buffer transfer unit 302, if the stand-by period has not elapsed, the synchronization control unit 304 performs count-up of the timer in step S606, and again performs the completion determination in step S605. If the notifications of completion of transfer have been issued from both the DMA transfer unit 301 and the buffer transfer unit 302 and the stand-by period has elapsed, the synchronization control unit 304 determines that the data transfer is complete, and moves to step S607. In step S607, the synchronization control unit 304 performs control for a buffer change in which a buffer for reception and a buffer for transmission are exchanged with each other. Also, the synchronization control unit 304 performs update of the transfer sequence. Specifically, the synchronization control unit 304 checks the result of the analysis from the command analysis unit 303 as described above, and performs switching of the mode in the method described with reference to FIG. 7. After the buffer change, the synchronization control unit 304 permits the issuing of the next DMA transfer request. As described above, the stand-by period is a period in which the synchronization control unit 304 stands by without issuing the next instruction until the buffer change becomes possible.

A buffer change will be specifically described below with reference to FIG. 6. For example, when writing to the first buffer 306 is performed and reading from the second buffer 307 is performed, the next operation is instructed at the point when both the writing and the reading are complete. At this time, the second buffer 307 is empty after the reading is complete, and data is accumulated in the first buffer 306 due to the completion of the writing. Therefore, the next writing is performed with the empty second buffer 307, and the reading is performed with the first buffer 306 in which data is present. In this way, the synchronization and exchange of write-target buffer and the read-target buffer is called buffer change. As described with reference to FIG. 8, the timing of buffer change differs according to the mode of the transfer sequence.

As described above, in this embodiment, the condition for determining the completion of data transfer is switched according to the data attribute, which is obtained as the result of the analysis (configuration data, or non-configuration data such as image data). In this way, during scan image processing in which data transfer on the bus 117 frequently occurs, even if the writing and the reading are complete, the next data transfer does not occur until a predetermined stand-by period elapses.

Figure 9A:
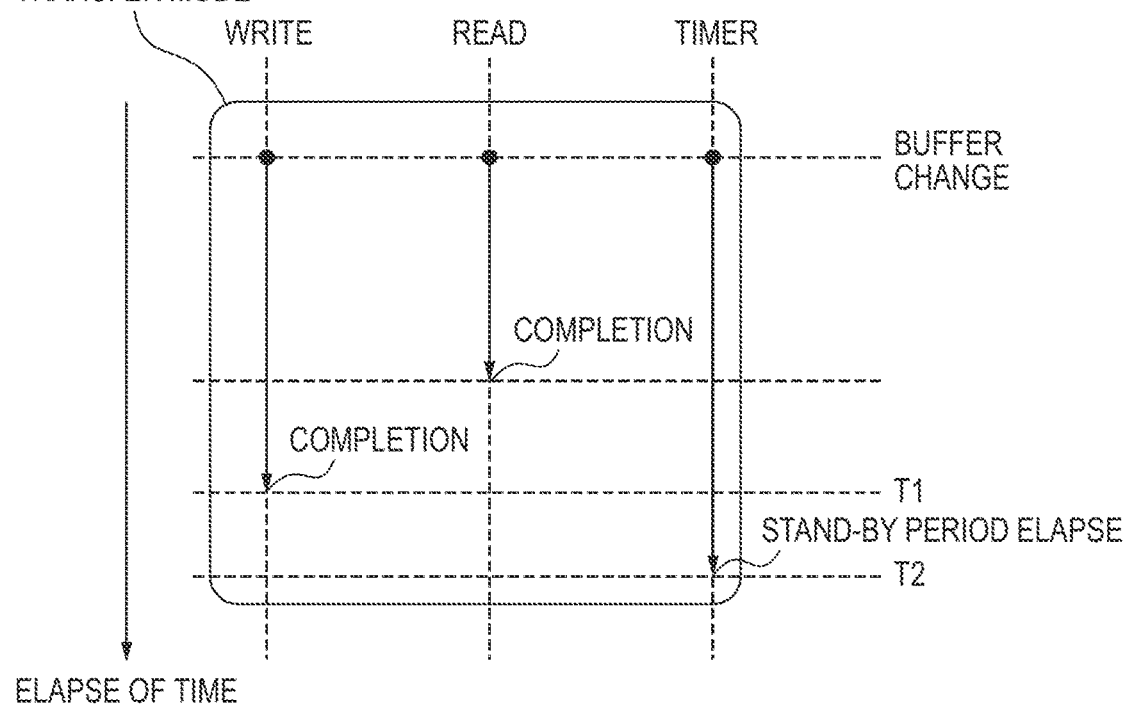
FIGS. 9A and 9B are schematic diagrams showing timings for buffer change.

FIG. 9A is a schematic diagram showing the progression of processing in the suppressed-speed transfer mode. In the suppressed-speed transfer mode, at time T1 at which data transfers for both the writing and the reading are complete after a buffer change, the next buffer change is not performed. After time T1, the synchronization control unit 304 stands by until time T2 at which the timer has been counted up and it is determined that the stand-by period has elapsed. In other words, since the synchronization control unit 304 do not perform the next buffer change until time T2 comes, the next data transfer is not started until time T2. Accordingly, in the suppressed-speed transfer mode, the bandwidth of the bus 117 can be kept available in the period from time T1 to time T2.

Request competition processing in the suppressed-speed transfer mode is shown in FIG. 4B. In the case of a series of DMA transfer requests related to scan image processing, the cycle of issuing the requests is longer than or equal to the stand-by period. Specifically, in the case of a series of DMA transfer requests RS1 to RS4 related to scan image processing, after RS1 is issued, even if the read/write of the corresponding data is complete, the next RS2 is not issued until the stand-by period elapses. When the stand-by period elapses, buffer change is performed and RS2 is issued. The relationship between RS2 and RS3 is similar to this. After RS3 is issued, even if the read/write of the corresponding data is complete, the next RS4 is not issued until the stand-by period elapses. Here, in a period P1 from when the read/write of the data corresponding to RS3 is complete to when the stand-by period elapses, processing of DMA transfer requests RP1 and RP2 related to the print image processing is started. For example, RP2 does not compete against either RS3 or RS4, RP2 is processed immediately after being issued. Thereafter, RS4 is issued. In this way, the bandwidth for the image transfer that is necessary for print processing can be ensured. The state of the series of DMA transfer requests RS1 to RS4 related to scan image processing shown in FIG. 4B is the above-described suppressed-speed transfer state.

Figure 9B:
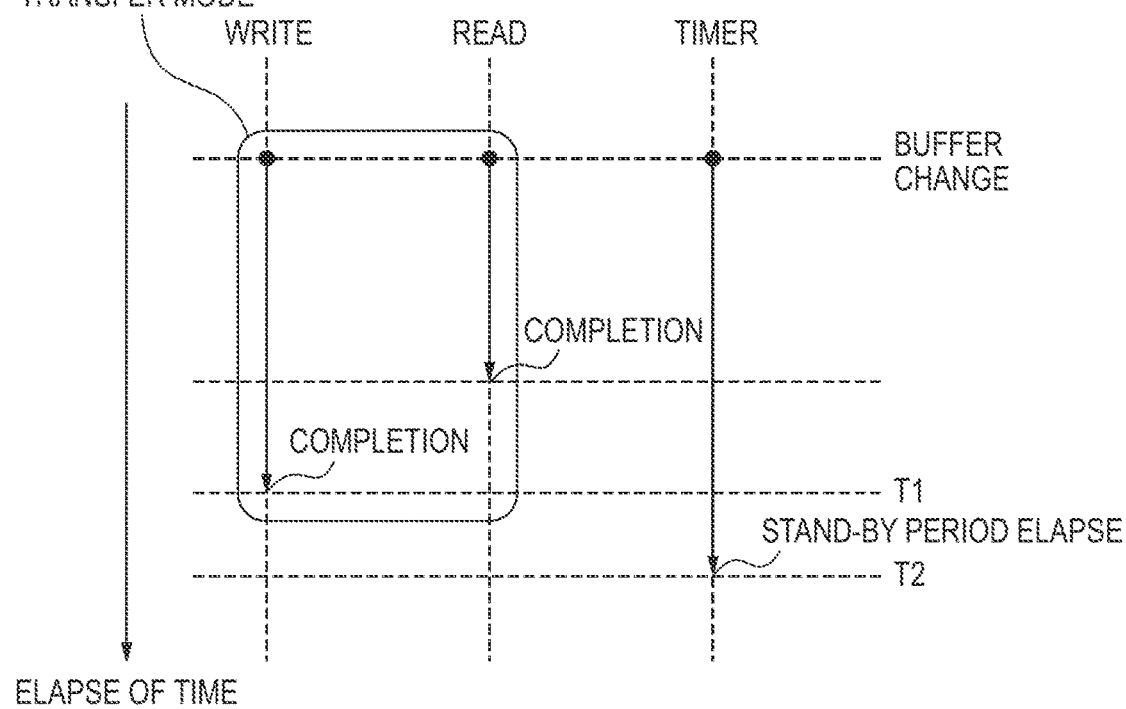

FIG. 9B is a schematic diagram showing the progression of processing in the high-speed transfer mode. When performing transfer of setting values and the like, by which occupation of the bus 117 is not likely occur because the frequency of data transfer is small, as shown in FIG. 9B, buffer change is performed at time T1 at which the data transfers of write and read are complete. Accordingly, if the suppressing of data transfer speed is not necessary, the suppressing is not likely to occur or does not occur.

In FIG. 4A corresponding to the high-speed transfer mode, there is no limitation due to the stand-by period in the case of a series of DMA transfer requests RS1 to RS5 related to scan image processing. If there is no competition at the point when the read/write of data corresponding to RS3 is complete, buffer change is performed and the next RS4 is issued. This RS4 competes against a DMA transfer request RP1 related to print image processing, and thus the processing of RP1 is delayed. Similarly, RS5 also competes against a DMA transfer request RP2 related to print image processing. The state of a series of DMA transfer requests RS1 to RS4 related to scan image processing shown in FIG. 4A is the above-described high-speed transfer state.

The suppressed-speed transfer state of a series of DMA transfer requests RS1 to RS4 related to scan image processing shown in FIG. 4B is a state where a DMA transfer request related to print image processing can interrupt more easily than in the high-speed transfer state shown in FIG. 4A. In this embodiment, it can also be expressed that the intervals between the requests are relatively long in the suppressed-speed transfer state, and the intervals between the requests are relatively short in the high-speed transfer state. In other words, it can also be expressed that the frequency at which the DMA transfer requests occupy the bus 117 can be switched between the suppressed-speed transfer state and the high-speed transfer state. In other words, in the suppressed-speed transfer state, in the case of a series of DMA transfer requests related to scan image processing, an interval is provided between a bus occupation period generated by a DMA transfer request and the next bus occupation period generated by the next DMA transfer request, and thus the two periods are separated. As a result, a DMA transfer request related to print image processing interrupts more easily.

In addition, in the multifunction peripheral 100 according to the embodiment, the CPU 111 transmits an activation interrupt to the calculation unit 116 every time the processing corresponding to N lines ends. After the activation, the calculation unit 116 switches between executing image transfer and LUT transfer in accordance with the display list. If the CPU 111 monitors this transfer state and the calculation unit 116 controls the data transfer speed of the calculation unit 116 at each time, there is a possibility that the load will be heavy and the processing will be delayed significantly. However, due to autonomous control being performed independently of the CPU 111 according to this embodiment, the transfer sequence of data transfer can be autonomously switched, and thus the calculation unit 116 can operate at appropriate timings without stopping the operation.

In addition, in the multifunction peripheral 100 according to this embodiment, a function of switching the mode according to the transfer sequence is implemented in the first input-side transfer unit 212, the first output-side transfer unit 213, the second input-side transfer unit 222, and the second output-side transfer unit 223. In this way, it is possible to perform switching of the data transfer speed appropriately even in the case where the size of image changes due to the image processing.

For example, in the case where input image enlargement processing is performed in the scan image processing unit 214, the data amount to be transferred from the output side increases. In this embodiment, the first output-side transfer unit 213 has a mode switch function similar to the first input-side transfer unit 212, and thus can handle the increase in the output data.

Note that, whichever of the input side and the output side has a larger amount of image data to be transferred is likely to have an influence on the bandwidth of the bus 117. Therefore, a configuration is possible in which, when the scan image processing unit 214 performs reduction processing, a mode switch function is implemented or enabled in the first input-side transfer unit 212, and when the scan image processing unit 214 performs enlargement processing, a mode switch function is implemented or enabled in the first output-side transfer unit 213.

In addition, when copy processing is performed, in the case where the print image processing unit 220 performs enlargement processing or the like and the large sized image data is transferred from the printer side, there is a possibility that ensuring the bandwidth of the bus 117 that is necessary for transferring image data for the scanner will be difficult. In such a case, a configuration is possible in which a mode switch function is implemented or enabled in the second input-side transfer unit 222.

Second Embodiment

Figure 10:
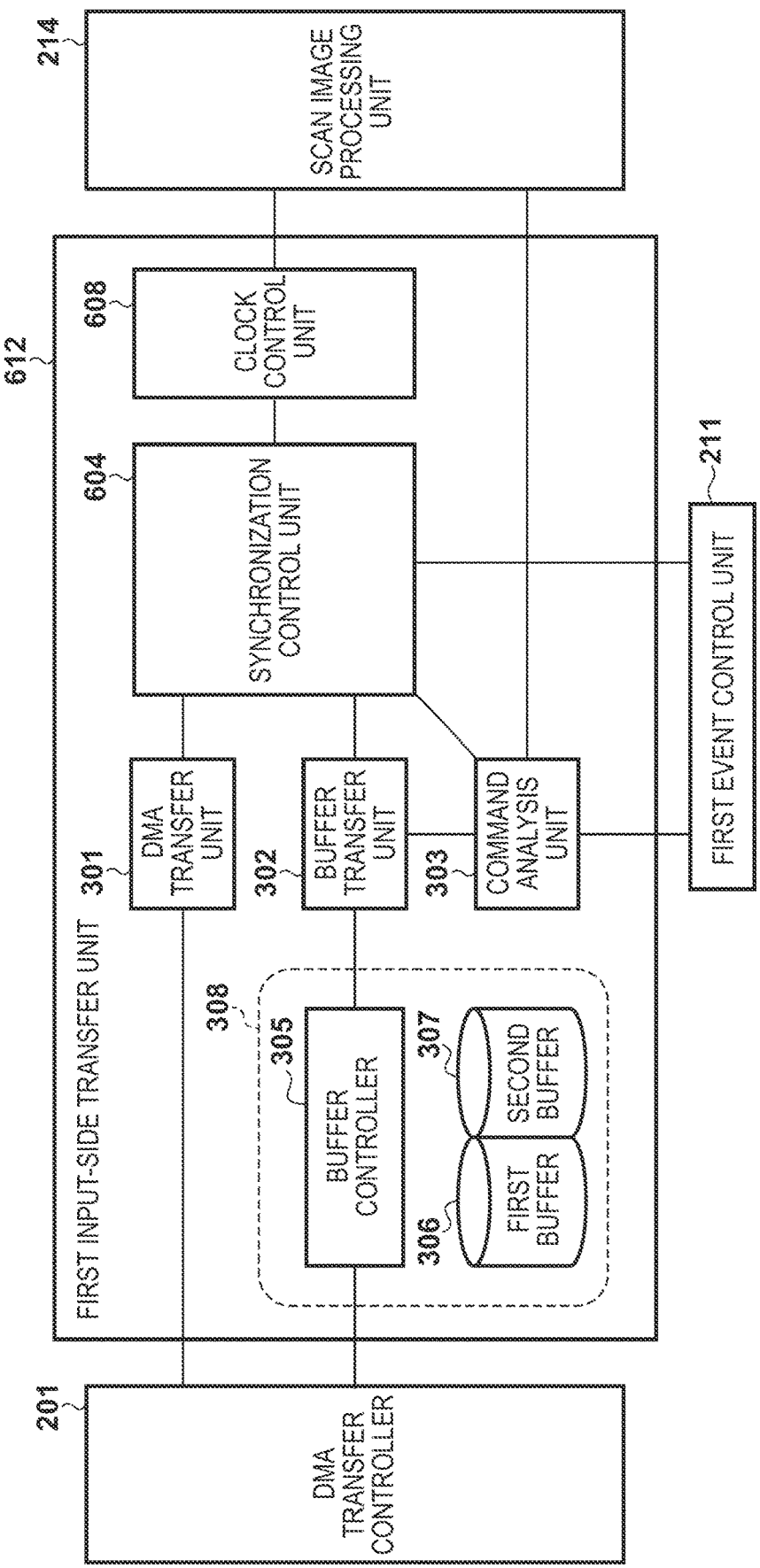
FIG. 10 is a block diagram showing functions and a configuration of a first input-side transfer unit according to a second embodiment.

The main object of a second embodiment is to suppress power that is consumed in the calculation unit when data transfer is not performed. FIG. 10 is a block diagram showing the functions and configuration of a first input-side transfer unit 612 according to the second embodiment. In this embodiment, a clock control unit 608 is provided in the first input-side transfer unit 612. The same is true of the first output-side transfer unit, the second input-side transfer unit, and the second output-side transfer unit as well.

The clock control unit 608 is a control circuit that switches ON/OFF of a clock supplied to the scan image processing unit 214 according to a clock control signal transmitted from a synchronization control unit 604.

The synchronization control unit 604 issues a clock control signal to the clock control unit 608 according to the transfer sequence of data transfer. In the suppressed-speed transfer mode, the synchronization control unit 604 controls the clock control unit 608 such that clock supply is suspended in the period from when the completion of data transfer is notified from both the DMA transfer unit 301 and the buffer transfer unit 302 to when the stand-by period has elapsed. To describe this with reference to FIG. 9A, the period from time T1 to time T2 is a period in which clock supply is turned OFF. Then, when resuming data transfer, the synchronization control unit 604 controls the clock control unit 608 so as to start clock supply. In the high-speed transfer mode, clock supply is controlled to be always turned ON.

The multifunction peripheral 100 according to this embodiment achieves actions and effects that are similar to the actions and effects achieved by the multifunction peripheral 100 according to the first embodiment. In addition, if the clock is supplied to the scan image processing unit 214 while data transfer is not performed, power is consumed while an image is not being processed. Contrary to this, in this embodiment, the clock control unit 608 is controlled by the synchronization control unit 604 as above. In this way, clock supply to the scan image processing unit 214 is suspended while data transfer is not performed, thus making it possible to suppress unnecessary power consumption.

Third Embodiment

Figure 11:
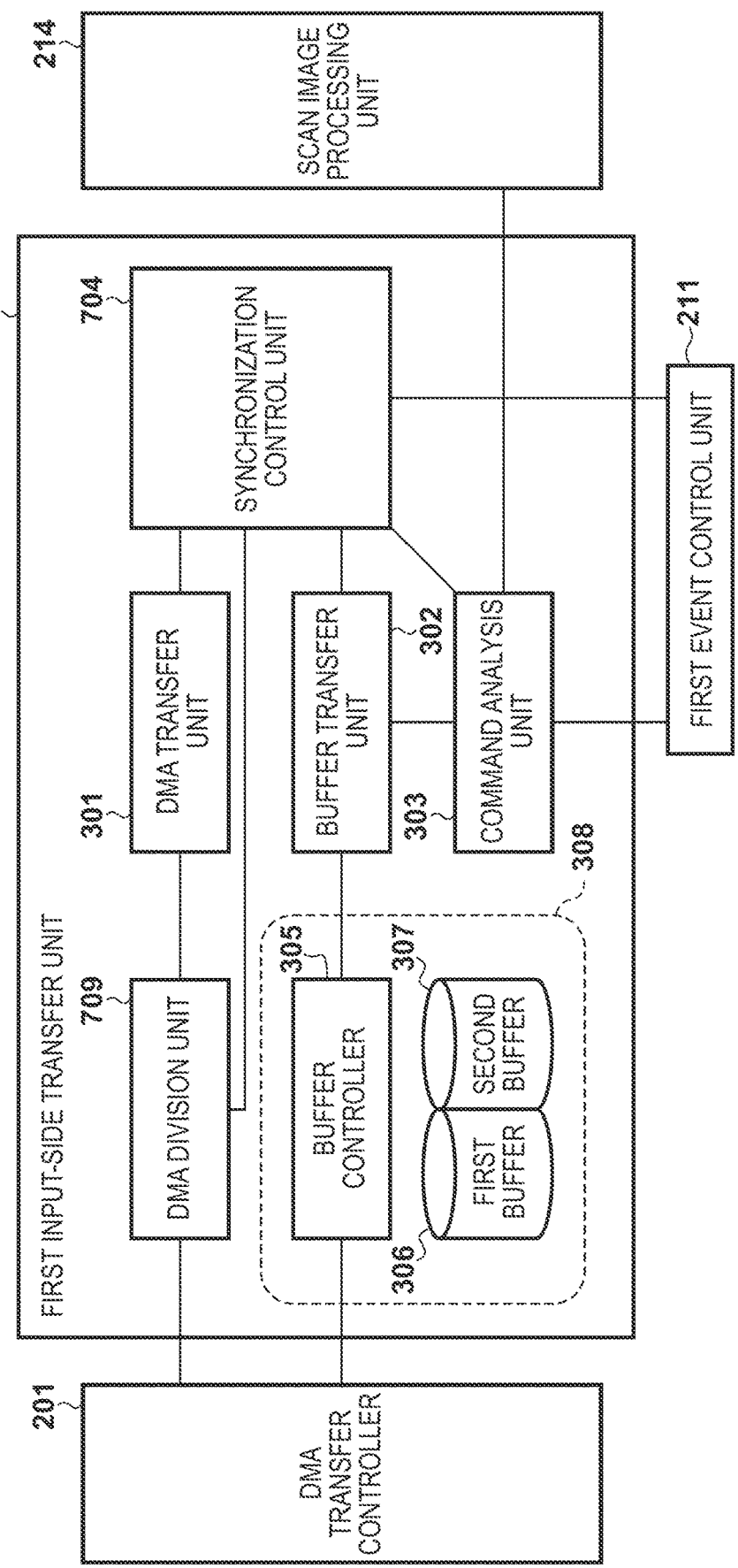
FIG. 11 is a block diagram showing functions and a configuration of a first input-side transfer unit according to a third embodiment.

The main object of a third embodiment is to make it possible to control the data amount of a DMA transfer request according to the data attribute, and to assign bandwidth to a DMA transfer with high priority at an appropriate timing, while using the bandwidth of the bus 117 effectively. FIG. 11 is a block diagram showing the functions and configuration of a first input-side transfer unit 712 according to the third embodiment. In this embodiment, a DMA division unit 709 is provided in the first input-side transfer unit 712. The same is true of the first output-side transfer unit, the second input-side transfer unit, and the second output-side transfer unit.

The DMA division unit 709 is a control circuit that switches the number of divisions used when a DMA transfer request from the DMA transfer unit 301 is divided according to the transfer sequence of the synchronization control unit 704.

Figure 12:
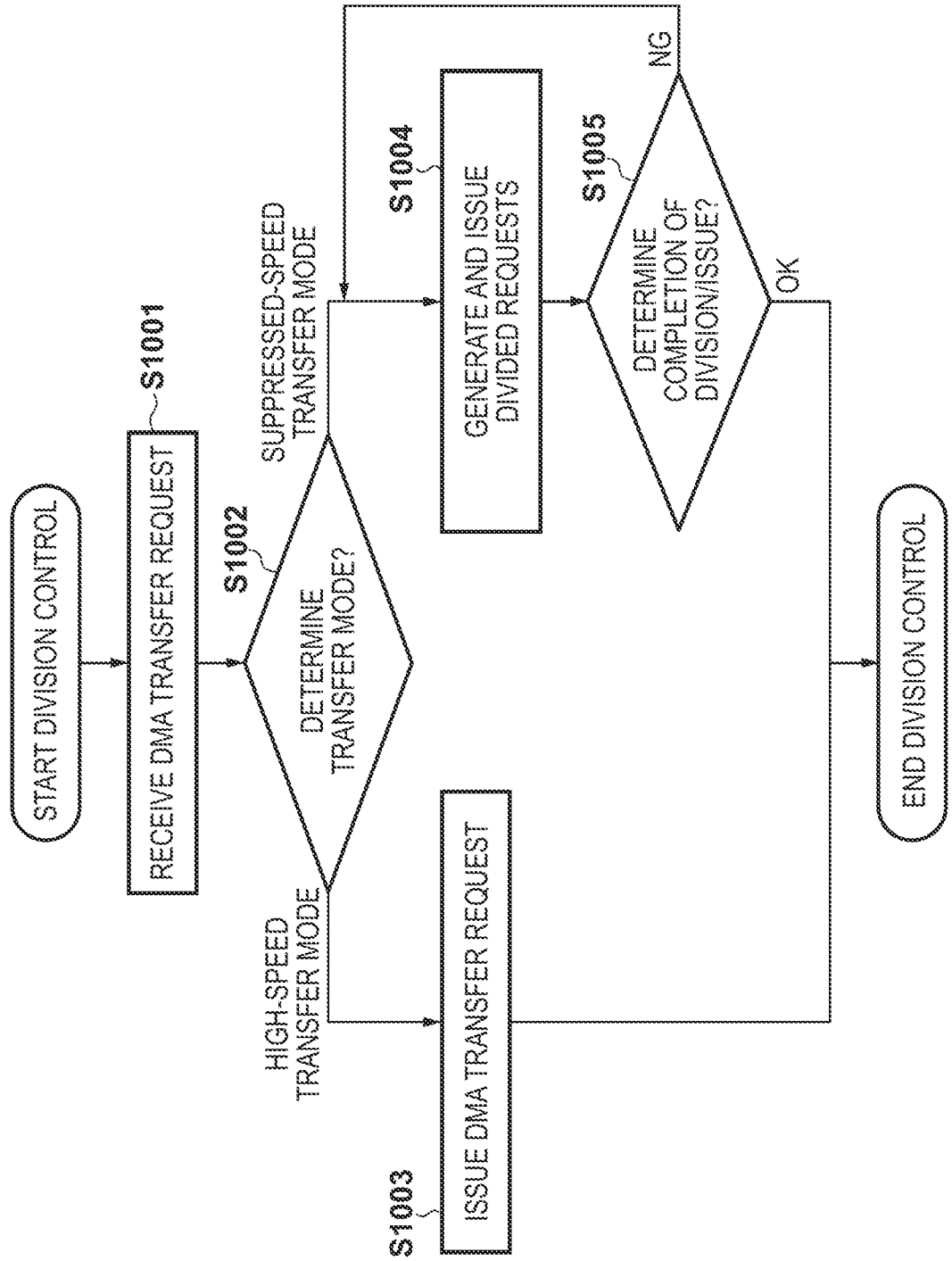
FIG. 12 is a flowchart for illustrating division control in a DMA division unit in FIG. 11.

FIG. 12 is a flowchart for illustrating the division control in the DMA division unit 709. In step S1001, the DMA division unit 709 receives a DMA transfer request from the DMA transfer unit 301. In step S1002, the DMA division unit 709 references the transfer sequence of the synchronization control unit 704. If the mode of the transfer sequence is the high-speed transfer mode, the DMA division unit 709 moves to step S1003. In step S1003, the DMA division unit 709 issues the DMA transfer request from the DMA transfer unit 301 without changing the data amount. For example, the DMA division unit 709 transmits the DMA transfer request from the DMA transfer unit 301 to the DMA transfer controller 201 as it is. If the mode of the transfer sequence is the suppressed-speed transfer mode in step S1002, the DMA division unit 709 moves to step S1004. In step S1004, the DMA division unit 709 divides the DMA transfer request from the DMA transfer unit 301 so as to generate multiple new DMA transfer requests (referred to as divided requests), and issues the divided requests to the DMA transfer controller 201.

Generation of the divided requests in step S1004 will be described below. FIGS. 13A to 13E are diagrams for illustrating the division of a DMA transfer request. In FIGS. 13A to 13E, the number of consecutive transfers of the DMA transfer request (FIG. 13A) issued from the DMA transfer unit 301 is denoted as R, and the number of consecutive transfers of a divided request (FIG. 13B to 13D) obtained by the division is denoted as T. The number T of consecutive transfers of a divided request is set when the command analysis unit 303 decodes a calculation setting command.

The DMA division unit 709 compares the number R of consecutive transfers of the DMA transfer request (FIG.

13A) from the DMA transfer unit 301 with the number T of consecutive transfers of a divided request, and if R>T, generates divided requests (FIG. 13B) each having the number T of consecutive transfers. These divided requests may be generated by replacing the number R of consecutive transfers of the DMA transfer request from the DMA transfer unit 301 with T. Note that, if T≥R, the DMA division unit 709 transmits the DMA transfer request from the DMA transfer unit 301 to the DMA transfer controller 201 as it is (division is not performed).

Next, the DMA division unit 709 compares R–T (that is, the remaining number of consecutive transfers after division) with T, and if R–T>T, generates divided requests having the number T of consecutive transfers (FIG. 13C). These divided requests may be generated by replacing the number R of consecutive transfers of the DMA transfer request from the DMA transfer unit 301 and adding an offset corresponding to the size of T to another field.

Next, the DMA division unit 709 compares R–2T with T, and if R–2T>T, generates divided requests having the number T of consecutive transfers (FIG. 13D). These divided requests may also be generated by replacing the number R of consecutive transfers of DMA transfer request from the DMA transfer unit 301 with T and adding an offset corresponding to the size of 2T to another field.

Next, the DMA division unit 709 compares R–3T with T, and if R–3T≤T, generates divided requests (FIG. 13E) having the number of consecutive transfers corresponding to the remaining number (R–3T) of consecutive transfers. These divided requests may be generated by replacing the number R of consecutive transfers of the DMA transfer request from the DMA transfer unit 301 with R–3T and adding an offset corresponding to the size of 3T to another field.

Returning to FIG. 12, in step S1005, the DMA division unit 709 moves to step S1004 if the total of number of consecutive transfers of the issued divided requests has not reached R times, and generates and issues divided requests again. On the other hand, if the total of number of consecutive transfers has reached R times, the DMA division unit 709 ends division control, and stands by until the next DMA transfer request is received from the DMA transfer unit 301.

With the multifunction peripheral according to this embodiment, the DMA division unit 709 divides a DMA transfer request in the suppressed-speed transfer mode, and does not perform the division in the high-speed transfer mode. In this way, the division control is switched according to the transfer sequence of the synchronization control unit 704. As a result, it is possible to switch the bandwidth usage rate of a DMA transfer request according to the mode of transfer sequence. Specifically, priority usage of the bus bandwidth is permitted instead of performing division control for a data transfer in which the data amount is small and high-speed transfer is desired, such as reading-out of a setting value of the calculation unit 116. On the other hand, with a data transfer with a large data amount such as reading-out of image data, the period in which the other device cannot use the bus 117 occurs relatively frequently. In the case of such data transfer in this embodiment, the DMA transfer request is divided into multiple divided requests, and therefore the data amount transferred by each divided request is smaller than the data amount to be transferred by the original DMA transfer request. By doing this, as shown in FIG. 4C, a DMA transfer request issued from the other device interrupts more easily. Specifically, DMA transfer requests RP1 and RP2 related to print image processing compete against a series of DMA transfer requests (divided requests thereof) RS'1, RS'2, RS'3, and RS'4 related to scan image processing. However, since the period for which an individual divided request occupies the bus 117 is relatively short, the time for which the processing of RP1 and RP2 waits is also relatively short. This is an aspect of "easy interrupt state".

In this way, according to the multifunction peripheral according to this embodiment, by switching the frequency at which the bus bandwidth is occupied on the scanner side according to the transfer sequence, parallel operation becomes possible, and data transfer can be performed preferentially in a device in which real-time operation is needed, such as a printer.

The configurations and operations of the multifunction peripheral according to embodiments have been described above. It is understandable for a person skilled in the art that these embodiments are exemplary and various modifications are possible in combinations of the constituent element and the processing, and that such modifications are also encompassed in the scope of the present invention.

In the first to third embodiments, the cases have been described in which a distinction between configuration data and non-configuration data such as an image data is adopted as the data attribute, but the present invention is not limited thereto. For example, it is also possible to set a threshold for the data amount and adopt whether the data amount is more or less than the threshold as the data attribute. Alternatively, the data attribute can also be set according to the application to which the technical idea according to the embodiment is applied.

In the first to third embodiments, the cases have been mainly described in which a DMA transfer request related to scan image processing competes against a DMA transfer request related to print image processing, but the present invention is not limited thereto. The technical idea according to the embodiments can be applied to the case where a DMA transfer request related to any first processing competes against a DMA transfer request related to any second processing. For example, a difference in priority can be present between the first processing and the second processing. In this case, by applying switching the mode of the transfer sequence for processing with a lower priority, parallel operation can be performed and processing with a higher priority can be prioritized. In the examples in FIGS. 4A to 4C, a case has been described in which a DMA transfer request related to print image processing interrupts more easily due to applying switching the mode of the transfer sequence for scan image processing, but the present invention is not limited thereto. For example, on the contrary, a state can also be realized in which a DMA transfer request related to scan image processing interrupts more easily due to applying switching the mode of the transfer sequence for print image processing.

In the first to third embodiments, the case in which the intervals between DMA transfer requests are widened and the case in which the occupation period of a request is shortened have been described as aspects of facilitating interrupt of a DMA transfer request, but the present invention is not limited thereto. For example, it is also possible to include a priority in a DMA transfer request and set a priority according to the transfer sequence. In this case, it is also possible to set a relatively low priority in the suppressed-speed transfer mode.

In the first to third embodiments, the case has been described in which the input-side transfer unit and the output-side transfer unit have a function of analyzing a command and switching the mode of the transfer sequence, but the present invention is not limited thereto. For example, this function can also be implemented in the DMA transfer controller.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-088783, filed Apr. 27, 2017, which is hereby incorporated by reference herein in its entirety.

What is claimed is:

1. A transfer device that is one of a plurality of transfer devices each configured to transfer data between a storage device and a processing device, the storage device and the transfer devices being connected via a bus, and the transfer device comprising:
    an issuing unit configured to issue a request for transferring data via the bus;
    an analysis unit configured to analyze a kind of data to be transferred; and
    a switching unit configured to switch a state of a series of requests for transferring data via the bus issued by the issuing unit between a first state and a second state, the second state of the series of requests for transferring data via the bus being a state in which a request for transferring data via the bus from another transfer device interrupts more easily than in the first state of the series of requests for transferring data via the bus, based on the kind of data obtained as a result of the analysis.

2. The transfer device according to claim 1, wherein the switching unit performs switching between the first state and the second state by switching a condition for determining that data transfer is complete according to the kind of data obtained as a result of the analysis.

3. The transfer device according to claim 2, further comprising a buffer transfer unit configured to transfer data between a buffer and the processing device,
    wherein the switching unit is configured to,
    in the first state, permit issuing of a next request based on a condition that it is determined that both data transfer between the storage device and the buffer corresponding to one request and data transfer between the buffer and the processing device corresponding to the one request are complete, and
    in the second state, permit issuing of a next request based on a condition that it is determined that both data transfer between the storage device and the buffer corresponding to one request and data transfer between the buffer and the processing device corresponding to the one request are complete, and furthermore a predetermined period has elapsed from when data transfer was instructed.

4. The transfer device according to claim 3, wherein the predetermined period is set when the analysis unit decodes a predetermined setting command.

5. The transfer device according to claim 3,
    wherein data to be transferred includes configuration data and non-configuration data,
    the analysis unit performs a first notification to the switching unit upon decoding a command for starting a transfer of non-configuration data, and performs a second notification to the switching unit upon decoding a command for ending a transfer of non-configuration data, and
    the switching unit, in accordance with the first notification, causes the state of the series of requests issued by the issuing unit to transition to the second state, and in accordance with the second notification, causes the state of the series of requests issued by the issuing unit to transition to the first state.

6. The transfer device according to claim 5, wherein the non-configuration data is image data and the configuration data is data including a setting for processing corresponding image data.

7. The transfer device according to claim 3,
    wherein the analysis unit performs a first notification to the switching unit upon decoding a command for starting a transfer of data, to be issued to the bus, whose amount is larger than a threshold, and performs a second notification to the switching unit upon decoding a command for starting a transfer of data, to be issued to the bus, whose amount is smaller than the threshold, and
    the switching unit, in accordance with the first notification, causes the state of the series of requests issued by the issuing unit to transition to the second state, and in accordance with the second notification, causes the state of the series of requests issued by the issuing unit to transition to the first state.

8. The transfer device according to claim 3, further comprising a control unit configured to control clock supply,
    wherein the control unit, in the second state, suspends clock supply in a period from when it is determined that both data transfer between the storage device and the buffer corresponding to one request and data transfer between the buffer and the processing device corresponding to the one request are complete, to when the predetermined period has elapsed.

9. The transfer device according to claim 3,
    wherein the buffer includes a first buffer and a second buffer, and
    data transfer between the storage device and the first buffer corresponding to one request and data transfer between the second buffer and the processing device corresponding to the one request are performed in parallel.

10. The transfer device according to claim 1,
    wherein the switching unit performs switching between the first state and the second state by switching a number of divisions of a request according to the kind of data obtained as a result of the analysis.

11. The transfer device according to claim 10, wherein the switching unit does not divide a request issued by the issuing unit in the first state, and divides a request issued by the issuing unit in the second state.

12. The transfer device according to claim 11, wherein the switching unit, in the second state, divides a request issued by the issuing unit into at least one request having a predetermined number of consecutive transfers, and a request having a number of consecutive transfers that is smaller than the predetermined number of consecutive transfers.

13. The transfer device according to claim 12,
    wherein the predetermined number of consecutive transfers is set when the analysis unit decodes a predetermined setting command.

14. The transfer device according to claim 1,
    wherein the transfer device is connected to a transfer processing unit that is also connected to the another transfer device, the transfer processing unit being connected to the storage device via the bus, and if a request from the transfer device competes against a request from the another transfer device, the transfer processing unit processes the requests in First-in First-out order.

15. The transfer device according to claim 1, wherein a CPU is connected to the bus, and the analysis unit and the switching unit operate independently of the CPU.

16. The transfer device according to claim 1, wherein the another transfer device is a reading device.

17. A control device that controls transfer of data from a reading device to an output device performed using a storage device and a processing device, the storage device and the control device being connected via a bus, and the control device comprising:
an analysis unit configured to analyze a command issued for transferring data to the output device via the bus for analyzing a kind of data to be transferred, and
a switching unit configured to switch a state of data in an issued series of commands between a first state and a second state in which data for transferring via the bus from the reading device is more likely to be transferred than in the first state, based on the kind of data obtained as a result of the analysis.

18. A method for controlling a transfer device that is one of a plurality of transfer devices each configured to transfer data between a storage device and a processing device, the storage device and the transfer device being connected via a bus, the method comprising:
issuing a request for transferring data via the bus;
analyzing a kind of data to be transferred, and
switching a state of an issued series of requests for transferring data via the bus between a first state and a second state, the second state of the series of requests for transferring data via the bus being a state in which a request for transferring data via the bus from another transfer device interrupts more easily than in the first state of the series of requests for transferring data via the bus, based on the kind of data obtained as a result of the analysis.

19. A multifunction peripheral comprising a scanner, a printer, and a control unit configured to control the scanner and the printer,
wherein the control unit includes:
a storage device for storing data to be used in copy processing performed using the scanner and the printer;
a calculation unit configured to process the data to be used in copy processing;
a CPU configured to control the control unit;
a bus to which the storage device, the calculation unit, and the CPU are connected; and
a bus arbiter configured to arbitrate a right to send a signal to the bus,
the calculation unit includes:
a first processing unit configured to process data scanned by the scanner;
a first transfer unit configured to transfer data between the storage device and the first processing unit;
a second processing unit configured to process data so as to be suited to printing by the printer;
a second transfer unit configured to transfer data between the storage device and the second processing unit; and
a transfer processing unit that is connected to the first transfer unit and the second transfer unit, and is configured to transmit a request from the first transfer unit or the second transfer unit to the bus arbiter via the bus,
in a case where a request from the first transfer unit competes against a request from the second transfer unit, the transfer processing unit processes the requests in First-in First-out order,
the first transfer unit includes:
an issuing unit configured to issue a request for transferring data via the bus;
an analysis unit configured to analyze a kind of data to be transferred; and
a switching unit configured to switch a state of a series of requests for transferring data via the bus issued by the issuing unit between a first state and a second state, the second state of the series of requests for transferring data via the bus being a state in which a request for transferring data via the bus from the second transfer unit interrupts more easily than in the first state of the series of requests for transferring data via the bus, based on the kind of data obtained as a result of the analysis.

20. A multifunction peripheral comprising a scanner, a printer, and a control unit configured to control the scanner and the printer,
wherein the control unit includes:
a storage device for storing data to be used in copy processing performed using the scanner and the printer;
a calculation unit configured to process the data to be used in copy processing;
a CPU configured to control the control unit;
a bus to which the storage device, the calculation unit, and the CPU are connected; and
a bus arbiter configured to arbitrate a right to send a signal to the bus,
the calculation unit includes:
a first processing unit configured to process data scanned by the scanner;
a first transfer unit configured to transfer data between the storage device and the first processing unit;
a second processing unit configured to process data so as to be suited to printing by the printer;
a second transfer unit configured to transfer data between the storage device and the second processing unit; and
a transfer processing unit that is connected to the first transfer unit and the second transfer unit, and is configured to transmit a request from the first transfer unit or the second transfer unit to the bus arbiter via the bus,
in a case where a request from the first transfer unit competes against a request from the second transfer unit, the transfer processing unit processes the requests in First-in First-out order,
the first transfer unit includes:
an issuing unit configured to issue a request for transferring data via the bus;
an analysis unit configured to analyze a kind of data to be transferred; and
a switching unit configured to switch a state of a series of requests for transferring data via the bus issued by the issuing unit between a first state and a second state, the second state of the series of requests for transferring data via the bus being a state in which a request for transferring data via the bus from the first transfer unit interrupts more easily than in the first state of the series of requests for transferring data via the bus, based on the kind of data obtained as a result of the analysis.

* * * * *